(12) United States Patent
Felder

(10) Patent No.: US 10,399,133 B2
(45) Date of Patent: Sep. 3, 2019

(54) TOOL CHANGING DEVICE FOR A FORMING PRESS

(71) Applicant: TRUMPF Maschinen Austria GmbH & Co. KG., Pasching (AT)

(72) Inventor: Johann Felder, Hall in Tirol (AT)

(73) Assignee: TRUMPF Maschinen Austria GmbH & Co. KG., Pasching (AT)

( * ) Notice: Subject to any disclaimer, the term of this patent is extended or adjusted under 35 U.S.C. 154(b) by 219 days.

(21) Appl. No.: 15/313,132

(22) PCT Filed: Apr. 24, 2015

(86) PCT No.: PCT/AT2015/000056
§ 371 (c)(1),
(2) Date: Jan. 18, 2017

(87) PCT Pub. No.: WO2015/176083
PCT Pub. Date: Nov. 26, 2015

(65) Prior Publication Data
US 2017/0144206 A1 May 25, 2017

(30) Foreign Application Priority Data

May 23, 2014 (EP) ..................................... 14001816
Jan. 19, 2015 (EP) ..................................... 15000136

(51) Int. Cl.
*B23Q 3/155* (2006.01)
*B21D 37/02* (2006.01)
(Continued)

(52) U.S. Cl.
CPC ............. *B21D 5/0254* (2013.01); *B21D 5/02* (2013.01); *B21D 37/145* (2013.01);
(Continued)

(58) Field of Classification Search
CPC ........ Y10T 483/1729; Y10T 483/1731; B23Q 3/155–3/15793; B21D 5/0254; B21D 37/145
(Continued)

(56) References Cited

U.S. PATENT DOCUMENTS 4,449,907 A * 5/1984 Yonezawa .............. B21D 37/14
425/183
4,945,629 A * 8/1990 Schafft ................. B21D 5/0209
483/29
(Continued)

FOREIGN PATENT DOCUMENTS

CN 102348518 A 2/2012
DE 29705509 U1 * 5/1997
(Continued)

OTHER PUBLICATIONS

Machine Translation of JP 05-084414 U, which JP '414 was published Nov. 1993.*
(Continued)

*Primary Examiner* — Erica E Cadugan
(74) *Attorney, Agent, or Firm* — Collard & Roe, P.C.

(57) ABSTRACT

The invention relates to a tool changing device (1) for a forming press (2), in particular a press brake, comprising at least one tool magazine (3, 4) and at least one transfer device (5, 6) for the transfer of the forming tools (7, 8) of the at least one tool magazine (3, 4), which are storable in the at least one tool magazine (3, 4), from the at least one tool magazine (3, 4) to the forming press (2) and in the reverse direction, wherein the at least one transfer device (5, 6) has a drivable thrust chain (9, 10) for the transmission of compressive and tensile forces.

20 Claims, 8 Drawing Sheets

Figure 1:
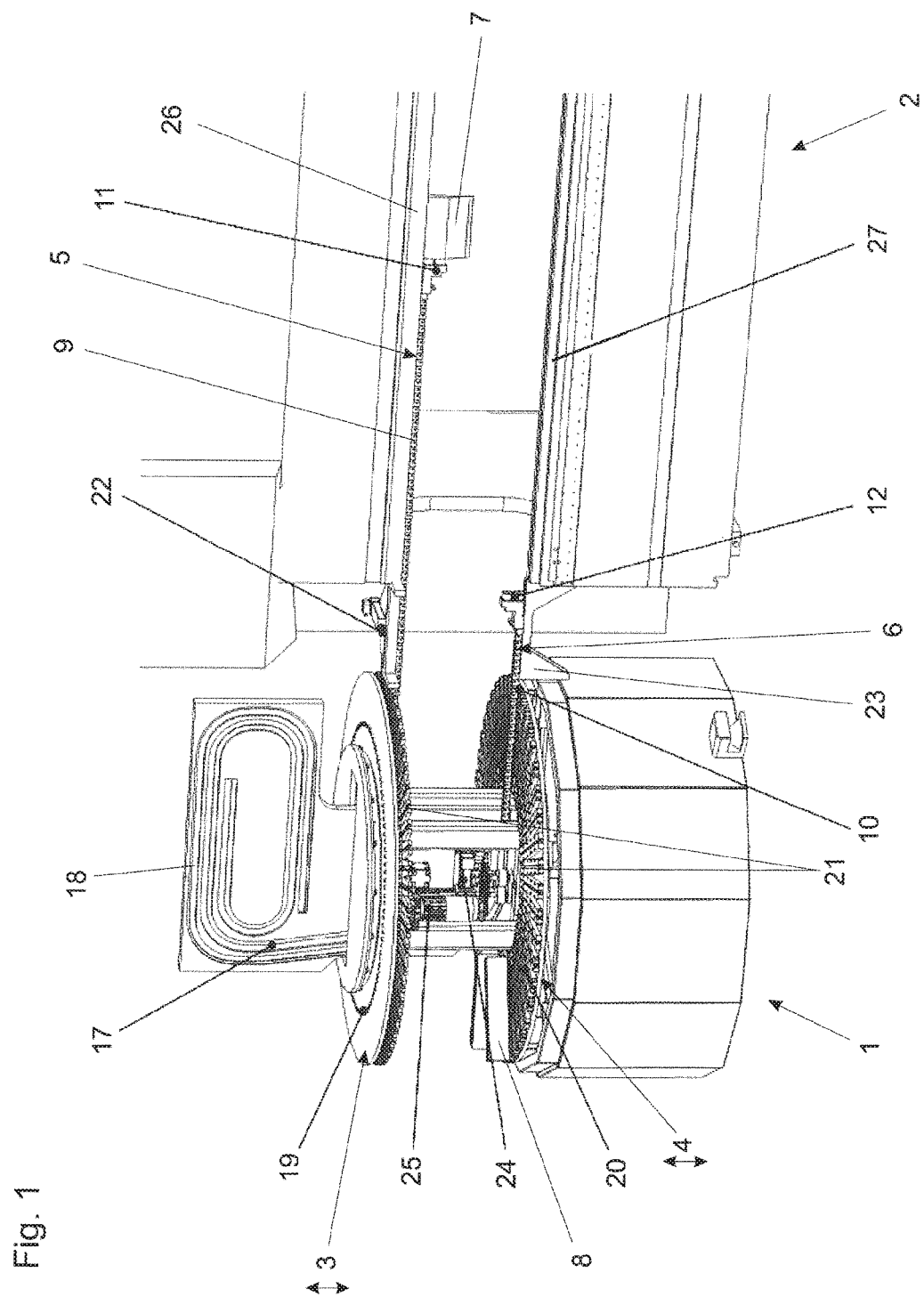

(51) Int. Cl.
*B21D 5/02* (2006.01)
*B23Q 3/157* (2006.01)
*B23Q 11/00* (2006.01)
*B21D 37/14* (2006.01)
*B21D 55/00* (2006.01)

(52) U.S. Cl.
CPC ..... *B23Q 3/15573* (2013.01); *B23Q 3/15722* (2016.11); *B23Q 11/0082* (2013.01); *B21D 55/00* (2013.01); *B23Q 3/15539* (2016.11); *B23Q 3/15546* (2013.01); *Y10T 483/10* (2015.01); *Y10T 483/11* (2015.01); *Y10T 483/13* (2015.01); *Y10T 483/136* (2015.01); *Y10T 483/14* (2015.01); *Y10T 483/1731* (2015.01); *Y10T 483/1845* (2015.01); *Y10T 483/1882* (2015.01)

(58) Field of Classification Search
USPC .................................................. 483/28–29
See application file for complete search history.

(56) References Cited

U.S. PATENT DOCUMENTS

| | | | |
|---|---|---|---|
| 5,366,431 | A | 11/1994 | Smith et al. |
| 5,443,166 | A | 8/1995 | Schutte et al. |
| 5,791,852 | A | 8/1998 | Bibby et al. |
| 6,013,017 | A | 1/2000 | Aizawa |
| 6,024,681 | A | 2/2000 | Latten et al. |
| 6,903,327 | B1 * | 6/2005 | Appleyard ............... B21D 5/02 250/221 |
| 2011/0308362 | A1 | 12/2011 | Buettner et al. |
| 2013/0203572 | A1 | 8/2013 | Denkmeier |
| 2013/0327104 | A1 | 12/2013 | Haselboeck |
| 2017/0312800 | A1 * | 11/2017 | Fischereder ......... B21D 5/0236 |
| 2017/0320123 | A1 * | 11/2017 | Cavicchia ............ B21D 5/0236 |
| 2018/0193896 | A1 * | 7/2018 | Haselboeck ......... B21D 5/0254 |

FOREIGN PATENT DOCUMENTS

| | | | |
|---|---|---|---|
| DE | 19643163 | A1 * | 4/1998 |
| DE | 102014116386 | A1 * | 5/2016 |
| EP | 377865 | A2 * | 7/1990 |
| EP | 1 138 413 | A2 | 10/2001 |
| JP | 57-181725 | A * | 11/1982 |
| JP | 58-119926 | U | 8/1983 |
| JP | 62-57717 | A | 3/1987 |
| JP | 63-93431 | A | 4/1988 |
| JP | 01-127624 | U | 8/1989 |
| JP | 02-22225 | U | 2/1990 |
| JP | 04-158926 | A | 6/1992 |
| JP | 05-084414 | U * | 11/1993 |
| JP | H11-5131 | A | 1/1999 |
| JP | 2002-361327 | A | 12/2002 |
| JP | 2008-087018 | A | 4/2004 |
| JP | 2013-538698 | A | 10/2013 |
| JP | 2014-504555 | A | 2/2014 |
| WO | WO-2016/109862 | A1 * | 7/2016 |

OTHER PUBLICATIONS

Machine Translation of JP 57-181725 A, which JP '725 was published Nov. 1982.*
Austrian Application AT A 50009/2015, filed Jan. 8, 2015.*
Machine translation of DE 102014116386, which DE '386 was published May 12, 2016.*
International Search Report of PCT/AT2015/000056, dated Aug. 21, 2015.

* cited by examiner a)

b)

TOOL CHANGING DEVICE FOR A FORMING PRESS

CROSS REFERENCE TO RELATED APPLICATIONS

This application is the National Stage of PCT/AT2015/000056 filed on Apr. 24, 2015, which claims priority under 35 U.S.C. § 119 of European Application Nos. 14001816.9 filed on May 23, 2014 and 15000136.0 filed on Jan. 19, 2015. The international application under PCT article 21(2) was not published in English.

The invention relates to a tool changing device for a forming press, in particular for a press brake, with at least one tool magazine and at least one transfer device for transferring the forming tools storable in at least one tool magazine from at least one tool magazine to the forming press and in reverse direction. The invention also relates to an arrangement comprising a forming press and a tool changing device according to the invention.

Forming presses, such as bending or folding presses, are generally operated by means of exchangeable tool sets. Depending on the type of workpiece to be produced or depending on the type of bending to be performed on a workpiece a specific tool set needs to be used. Tool sets are mostly refitted by hand. However, this is disadvantageous, as the refitting process is physically demanding, particularly in the case of heavy forming tools. Furthermore, it takes a lot of time, which means that it is expensive to produce smaller and medium-sized batch sizes.

Attempts have been made to automate the refitting process. In this case robot arms or movable grippers are used for exchanging the tool sets.

However, solutions of this kind are technologically very complex and take up a large amount of space due to the working area required by a robot arm for example.

The objective of the present invention is to avoid the described disadvantages by providing a tool changing device which is improved over the prior art or an arrangement comprising a forming press and such a tool changing device.

Said objective is achieved by the features described herein.

Thus according to the invention the at least one transfer device comprises a drivable push chain for transferring pushing and pulling forces.

By providing a push chain an extremely reliable and precisely operating transfer device is achieved. Furthermore, the tool changing device can be designed to be very compact.

According to one advantageous configuration of the invention, the push chain comprises at least one coupling device for the temporary coupling of a forming tool to the push chain. It can be particularly advantageous if a measuring system is provided for preferably continuously determining the position of the coupling device—and thus for determining the position of the forming tool coupled to the coupling device relative to the forming press.

Knowing the position of the coupling device or a forming tool coupled to the coupling device makes it possible to build multi-part tools, i.e. to build tools which comprise a plurality of part tools arranged next to one another in the forming press.

The measuring system can be integrated into the coupling device. Alternatively or in addition, a measuring system can also be provided which does not move with the coupling device, but is arranged on a component with a fixed position relative to the tool changing device or relative to the forming press and detects, e.g. optically, the position of the coupling unit or of a forming tool coupled to the coupling unit.

If the coupling device requires powering with electricity or the forwarding of signals to or from the coupling device, it is also advantageous if the push chain is formed by chain links which have recesses for mounting, preferably electrical lines. In this case the push chain transfers not only pushing and pulling forces, but also for example electrical power and signals.

According to an alternative embodiment, the coupling device comprises a storage for storing electric power. In this case, the storage can be arranged replaceably on the coupling device so that it can be replaced by a charged storage when empty. Alternatively, it is possible for the coupling device to comprise an interface for transferring electrical power to the storage. If at the same time a counter interface is provided, e.g. in the region of a chain storage for storing the push chain, the storage can always be recharged if the push chain is located in the chain storage, i.e. during periods of rest between tool changing procedures.

Furthermore, a communication device for the wireless exchange of data, e.g. with a control system for controlling the tool changing device, can also be enclosed by the coupling device. If such a communication device and at the same time a storage for storing electrical power are provided, it is also not necessary to provide recesses in the chain links for mounting, preferably electrical lines.

It has also turned out to be advantageous if the coupling device comprises a magnetic coupling element, preferably in form of at least one permanent magnet in combination with at least one electromagnet. The use of a permanent magnet is advantageous as in this way it is possible to ensure that the forming tools are always held by the coupling device, i.e. even in the case of power failure. By combining with an electromagnet the total magnetic force can be regulated which is relevant with respect to forming tools of various weights or for the uncoupling of the forming tools. To control the magnetic force only the flow of current through the electromagnet needs to be changed.

According to a further advantageous measure the coupling device comprises at least one sensor for detecting a forming tool coupled to the coupling device. This measure facilitates the control of tool changing processes.

It has proved to be advantageous that the push chain can be driven by at least one drive device, wherein the at least one drive device preferably comprises at least one pair, particularly preferably two pairs, of drive shafts. In this case it is possible that the transmission of force from the at least one drive device to the push chain is performed by frictional connection and/or by a form-locking connection. Furthermore, it is possible for the drive shafts to be coated (to increase the frictional connection), and/or for the pressing forces of drive shafts to be adjustable to the push chain by means of at least one adjusting device, which preferably comprises at least one spring.

A frictional drive has the advantage over a form-locking drive that less noise is created and the push chain is less worn. However, the push chain can be positioned more accurately with a form-locking drive.

The less precise positioning of the push chain in a frictional drive compared to a form-locking drive can be compensated for however by providing the measuring system for determining the position of the coupling device or a forming tool coupled to the coupling device.

A further advantage of using a push chain is that it can be stored in a very compact manner. For this purpose, according to an advantageous example embodiment of the invention, the tool changing device comprises at least one, preferably spiral-shaped chain storage for storing the push chain.

According to a preferred embodiment of the invention, the at least one tool magazine comprises a drivable, rotatably mounted disc with a central recess and the at least one push chain can be moved from the area of the recess for transferring the forming tools stored in at least one tool magazine from at least one tool magazine to the forming press and in opposite direction. For changing a forming tool the disc has to be rotated only in a specific position. Afterwards the forming tool can be transferred directly from the disc by means of the push chain to the forming press or in opposite direction. In this way it is possible to change the forming tools rapidly.

In order to adjust the tool changing device flexibly to different forming presses, it is also possible that the at least one tool magazine is designed to be height-adjustable and/or laterally adjustable for adjusting the height or lateral position of the at least one tool magazines to the forming press.

It has turned out to be advantageous that the at least one tool magazine comprises a drivable, rotatably mounted, and in position of use preferably horizontally aligned disc having receiving means for receiving the forming tools, wherein the receiving means are designed particularly preferably such that the forming tools are fixed on a rotation of the disc. The fixing can be performed for example by clamping. In order to increase the storage capacity a plurality of such discs can be provided, the heights of which can be adjusted, preferably automatically.

As a forming press, such as e.g. a press brake, requires two different kinds of forming tools, namely on the one hand stamping tools and on the other hand counter tools for the stamping tools, it has proved to an advantageous that the tool changing device comprises at least one first tool magazine for storing the stamping tools and at least one second tool magazine for storing the counter tools for the stamping tools, wherein the tool magazines are preferably arranged above one another in a position of use.

This configuration of the invention can be developed further in an advantageous manner in that the tool changing device comprises a first transfer device for transferring the forming tools stored in the first tool magazine from the first tool magazine to the forming press and in opposite direction and a second transfer device for transferring the forming tools storable in the second tool magazine for the second tool magazine to the forming press and in opposite direction, wherein preferably both transfer devices comprise a drivable push chain for transferring pushing and pulling forces. The idea behind this configuration is thus that the stamping tools and the counter tools for the stamping tools can be transferred at the same time and independently of one another from the respective tool magazine to the forming press and in opposite direction. In this way the time required for the refitting process can be reduced further.

In order to perform a fully automatic refitting in an advantageous manner it is possible that a control system is provided for controlling the tool changing device, preferably for the fully automatic transfer of the forming tools storable in the at least one tool magazine from at least one tool magazine to the forming press and in opposite direction according to a prespecified program, wherein the control system preferably comprises at least one processor and/or one storage for storing a program. If the refitting process runs fully automatically according to a prespecified program, it is no longer necessary for an operator to be in the immediate vicinity of the tool changing device or the forming press. In this way the safety of the operating staff can be increased.

In support of this the safety can be increased in that a detection system is provided for detecting an object located in the vicinity of the tool changing device, preferably an operator. In this way it is possible to ensure that no-one is situated in the danger zone of the tool changing device or the forming press during the refitting process. Advantageously, the detection system comprises laser means, such as e.g. light barriers or the like, which are active during the refitting process and on the detection of an object bring about the immediate interruption of the refitting process.

And lastly according to an advantageous example embodiment of the invention, the tool changing device comprises at least one device for connecting the tool changing device to the forming press, wherein said device preferably comprises a guide for the push chain and/or elements connected to the latter.

In this case, according to a particularly advantageous development of this example embodiment, it is possible that the at least one device comprises a turning unit for connecting the tool changing device to the forming press for rotating the forming tools, preferably by 180°. Such a turning unit provides two advantages: firstly it is possible to use forming tools which are not symmetrical, in two different positions in relation to the clamping bar of the forming press. Secondly, by means of the turning unit in a simple manner there can be temporary uncoupling from the forming press. This is an advantage in particular with regard to the upper clamping bar, as the latter causes the relative movement of the two clamping bars to one another—and thus the relative movement of forming tools clamped therein—during a forming process.

There is an uncoupling if the turning unit is located in an intermediate position between 0° and 180°.

Protection is also sought for an arrangement comprising a forming press and a tool changing device according to the invention and for the use of a push chain for transferring pushing and pulling forces in a tool changing device according to the invention.

Further details and advantages of the present invention are explained in more detail in the following by way of the description of the figures with reference to the drawings.

Figure 2:
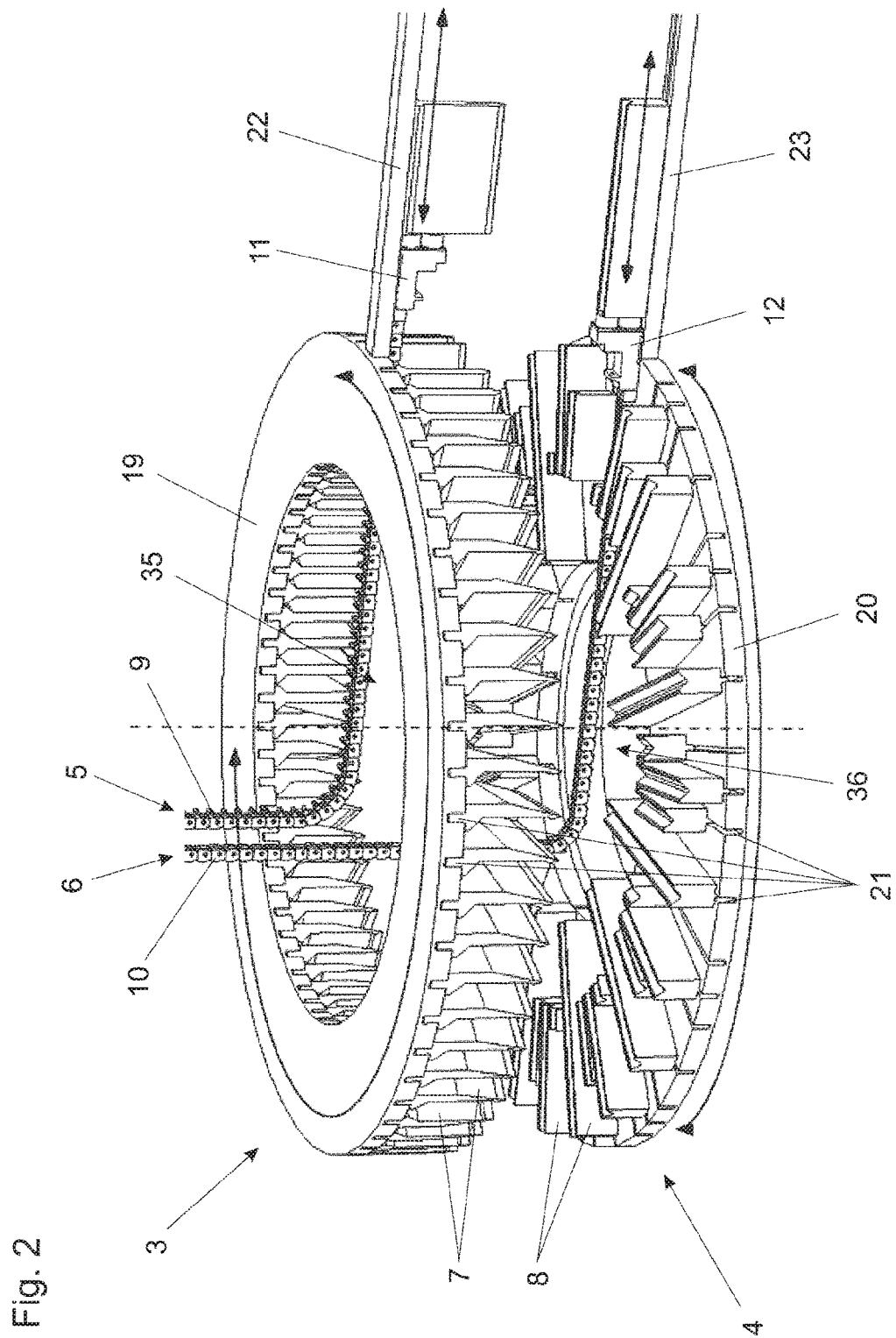
Figure 3:
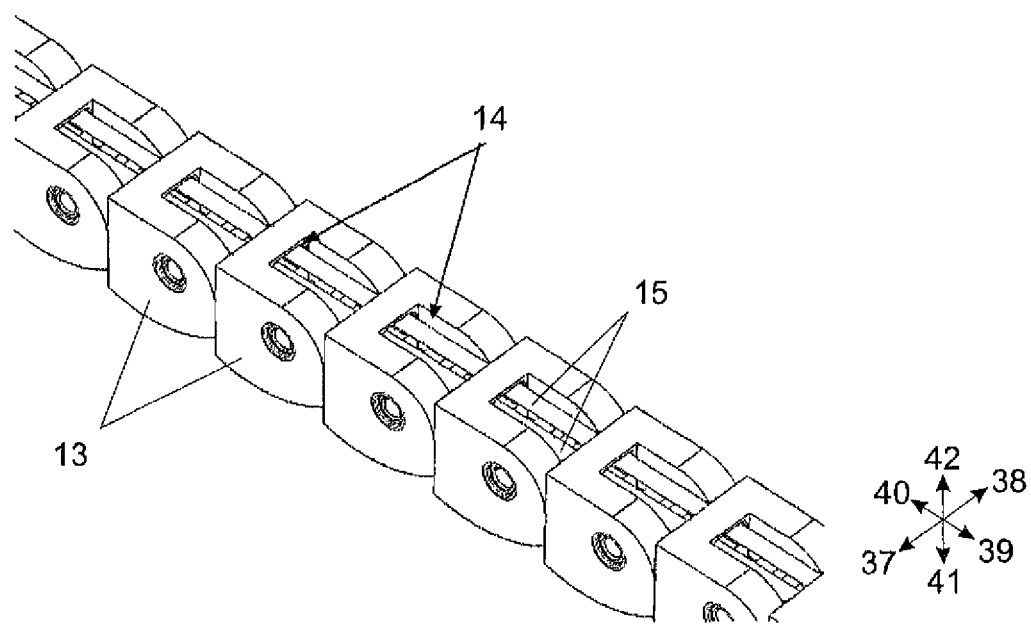
Figure 4:
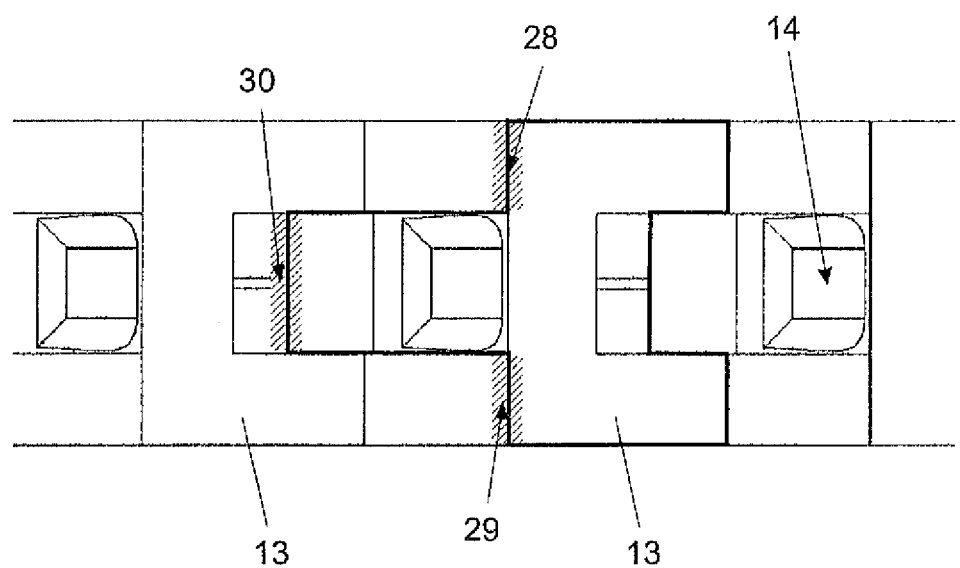
Figure 5:
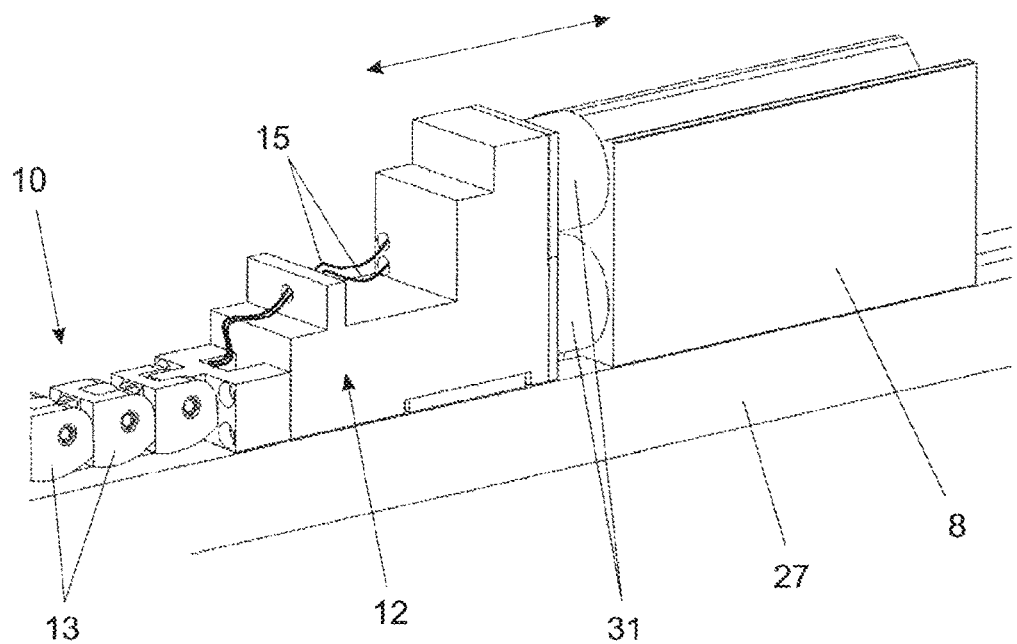
Figure 6:
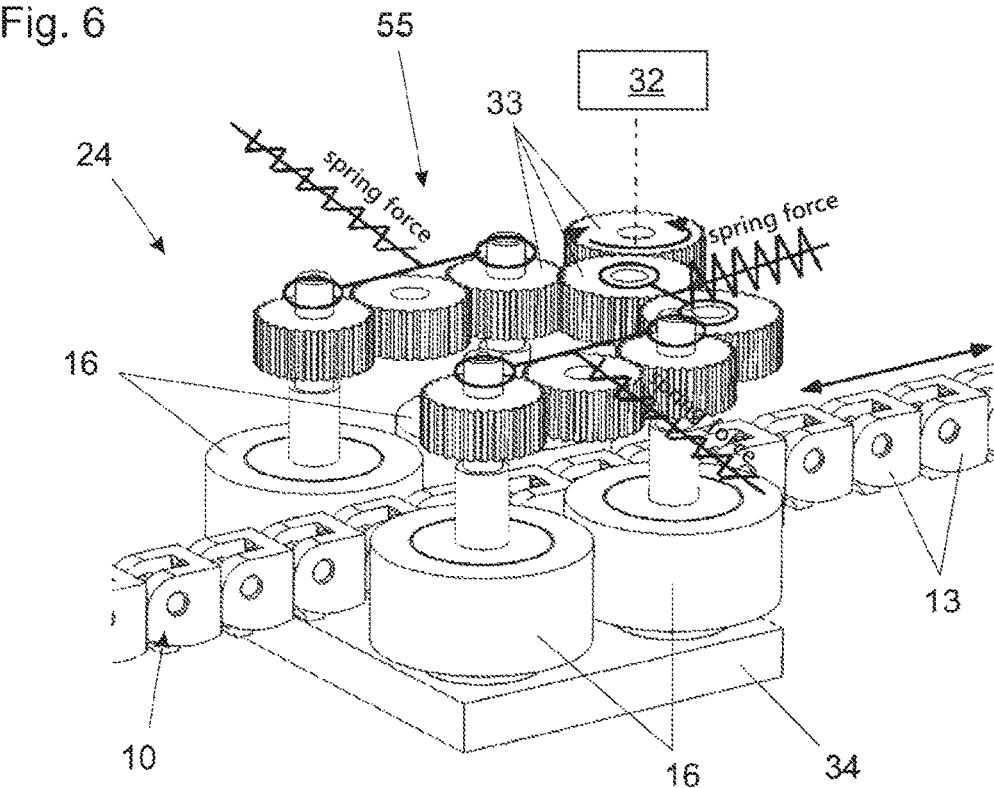
Figure 7:
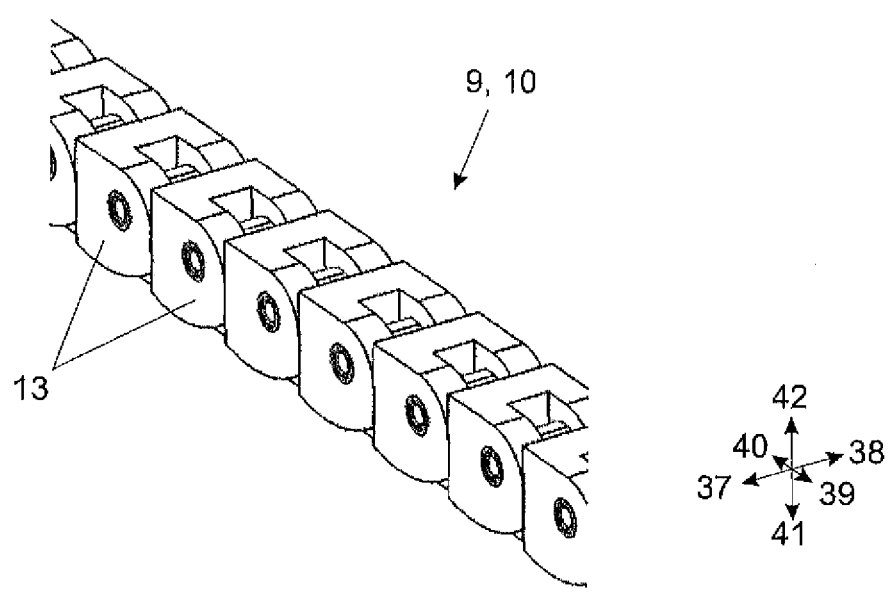
Figure 8:
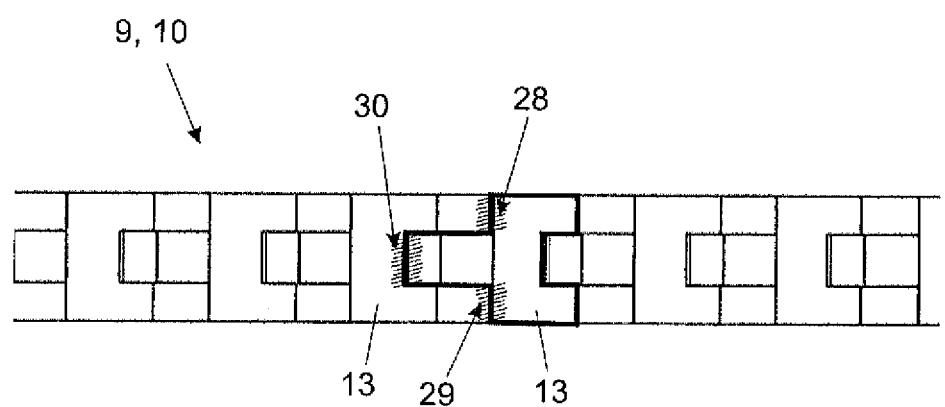
Figure 9:
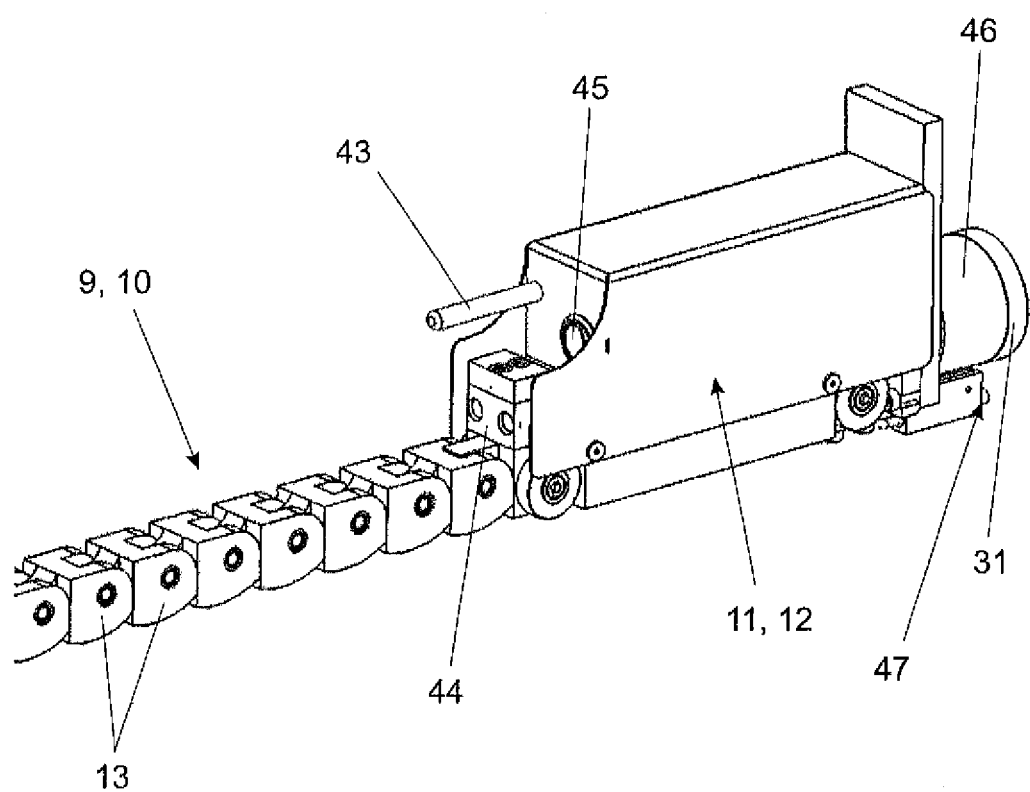
Figure 10:
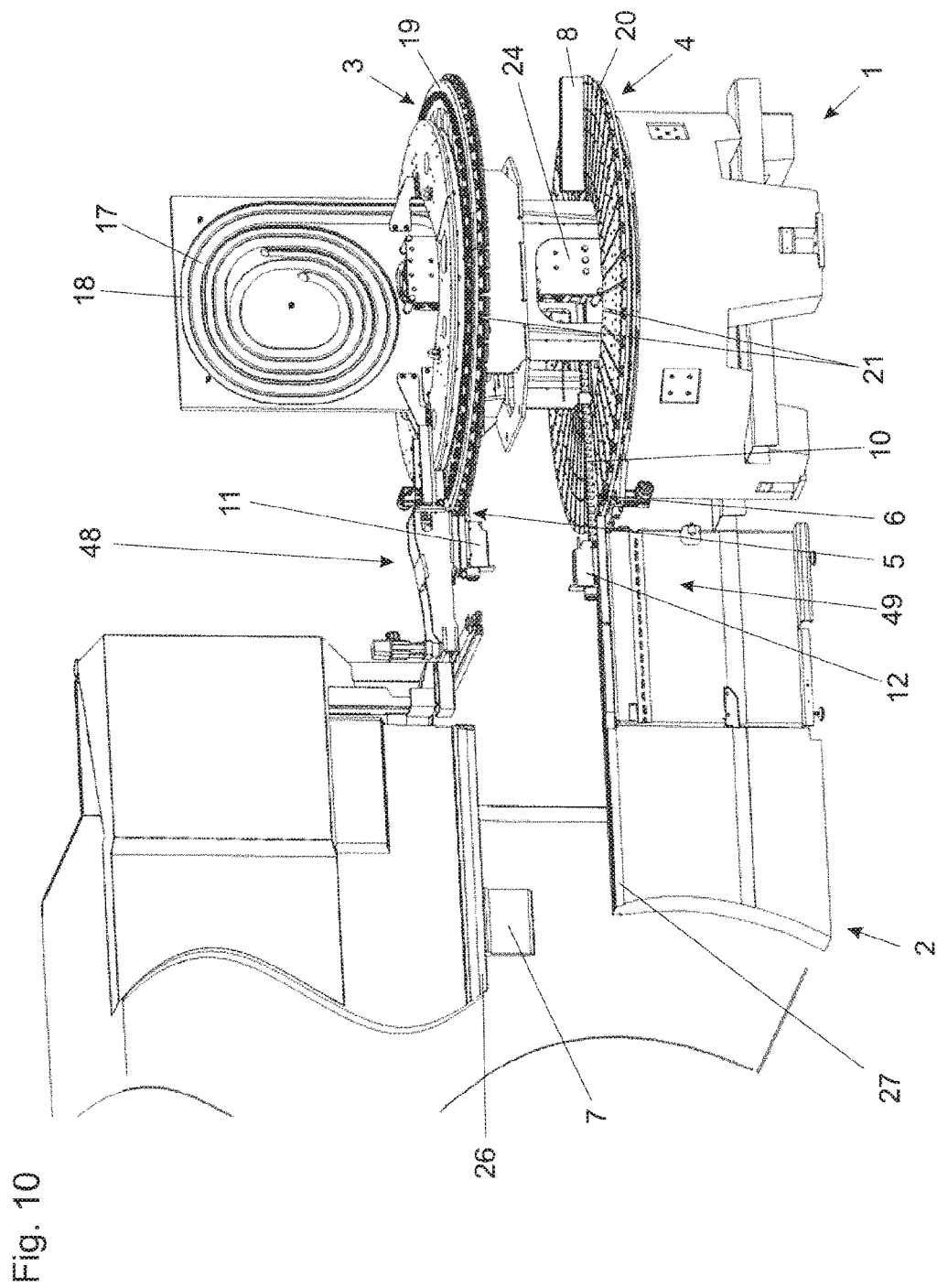
Figure 11:
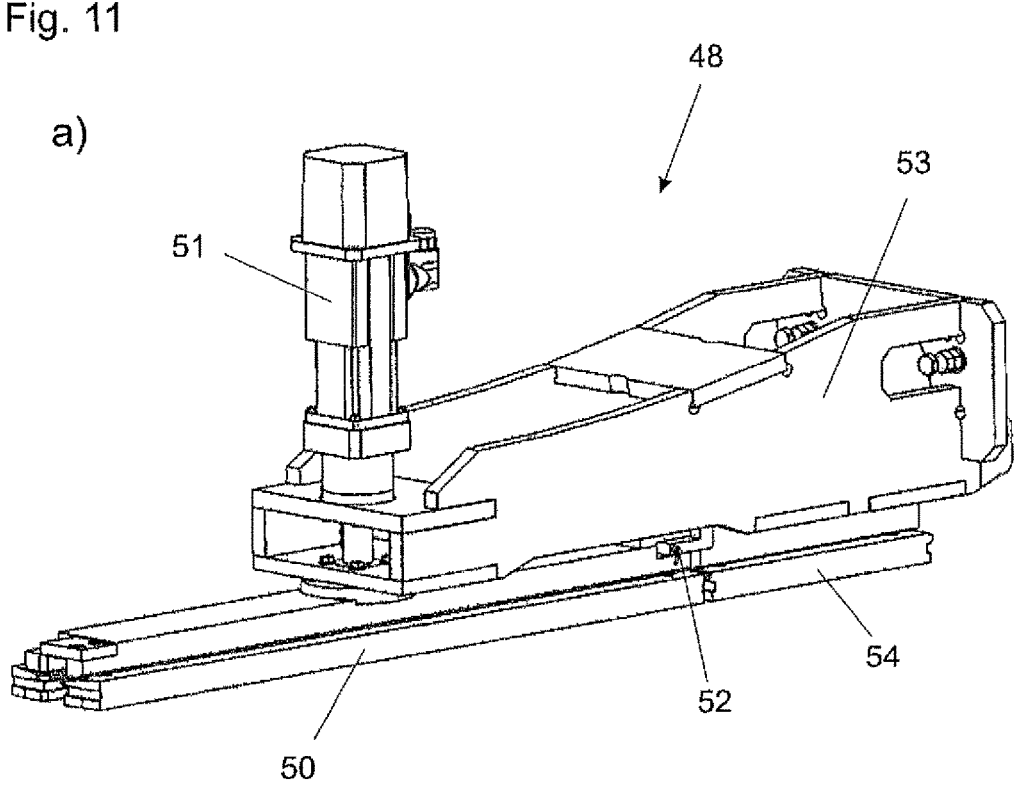
Figure 11:
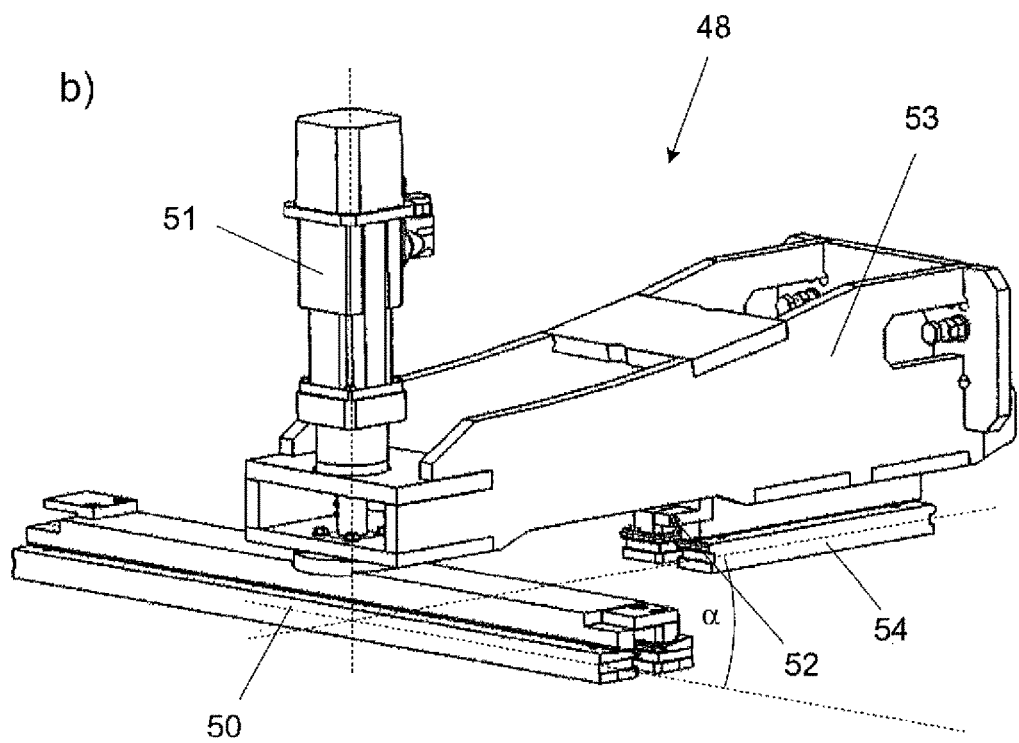

In the latter:

FIG. 1 shows an arrangement comprising a tool changing device and a forming press in the form of a press brake according to a first embodiment, FIG. 2 shows a section of the tool changing device shown according to the invention in FIG. 1, FIG. 3 shows a section of a push chain in a perspective schematic view according to a first embodiment, FIG. 4 shows a plan view of the push chain according to FIG. 3, FIG. 5 shows a coupling device connected to a push chain for the temporary coupling of a forming tool to the push chain according to a first embodiment, FIG. 6 shows a drive device for the push chain, FIG. 7 shows a section of a push chain in a perspective schematic view according to a second embodiment, FIG. 8 shows a plan view of the push chain according to FIG. 7, FIG. 9 shows a coupling device connected to a push chain for the temporary coupling of a forming tool to the push chain according to a second embodiment, FIG. 10 shows an arrangement of a tool changing device according to the invention and a forming press in the form of a press brake according to a second embodiment, and FIG. 11 a), b) show a turning unit for rotating the forming tools, which is provided in the embodiment shown in FIG. 10, wherein the part figures a) and b) show two different positions of the turning unit.

FIG. 1 shows an arrangement comprising a forming press 2 in the form of a press brake and a tool changing device 1, which is set up in the immediate vicinity of the forming press 2, in this case next to the forming press 2.

The tool changing device 1 comprises a first tool magazine 3 for storing stamping tools 7 and a second tool magazine 4 for storing counter tools 8 for the stamping tools 7, wherein the two tool magazines 3 and 4 are arranged above one another in a position of use.

Each of the tool magazines 3 or 4 comprises a drivable, rotatably mounted, and in position of use horizontally aligned disc 19 and/or 20 having receivers 21 for receiving the forming tools 7 and 8, wherein said receivers 21 are designed such that the forming tools 7 and 8 are fixed on the rotation of the disc 19 and/or 20.

FIG. 1 shows the drive device 25 for the first, i.e. upper tool magazine 3 for storing the stamping tools 7. The drive device for the second tool magazine 4 is arranged in the housing of the tool changing device 1 underneath the second tool magazine 4 for storing the counter tools 8 for the stamping tools 7 and is thus not visible.

The two tool magazines 3 and 4 are designed to be height-adjustable, so that the height of the tool magazines 3 and 4 can be adjusted in a simple manner to the forming press 2.

The tool changing device 1 comprises a first transfer device 5 for transferring the forming tools 7 stored in the first tool magazine 3 from the first tool magazine 3 to the forming press 2 and in opposite direction, and a second transfer device 6 for transferring the forming tools 8 stored in the second tool magazine 4 from the second tool magazine 4 to the forming press 2 and in opposite direction. The two transfer devices 5 and 6 comprise a drivable push chain 9 and/or 10 for transferring pushing and pulling forces.

Furthermore, each of the two push chains 9 and 10 comprise a coupling device 11 or 12 for the temporary coupling of a forming tool 7 or 8 to the push chain 9 or 10, wherein said coupling device 11 or 12 in the shown example embodiment is arranged at a first end of the push chain 9 or 10.

The push chains 9 and 10 can be stored, from a second end, respectively in a spiral-shaped chain storage 17 or 18, which is arranged in the upper part of the tool changing device 1.

In the shown example embodiment it is thus possible that two independent push chains 9 and 10 operating independently of one another are provided for transferring on the one hand the stamping tools 7 and on the other hand the counter tools 8 for the stamping tools 7. Alternatively, it is also possible that only one push chain is provided, wherein the middle part of the push chain is stored temporarily in a buffer. Also in such a configuration the two ends of the push chain could work independently of one another.

The tool changing device 1 is connected via two devices 22 and 23 to the forming press 2, wherein the two devices 22 and 23 each comprise a guide for the push chain 9 or 10 and/or elements connected thereto. In the shown example embodiment respectively one of the tool magazines 3 or 4, one of the devices 22 or 23 for connecting the tool changing devices 1 to the forming press 2 and one of the clamping bars 26 or 27 of the press brake 2 are arranged at the same height, so that the transfer of the forming tools 7 or 8 between the tool magazines 3 and 4 and the forming press 2 takes place in a horizontal plane.

FIG. 1 also shows schematically the drive device 24 for the lower push chain 10. Details of said drive device 24 are explained in more detail in the description of FIG. 6.

FIG. 2 shows an enlarged section of the tool changing device. Said Figure shows in particular the two tool magazines 3 and 4 in the form of rotatably mounted discs 19 and 20, on which the stamping tools 7 and the counter tools 8 for the stamping tools 7 are arranged. The two discs 19 and 20 include respective groove-like receivers 21 for receiving the forming tools 7 and 8, wherein the receivers 21 are designed such that the forming tools 7 and 8 are fixed on rotation of the disc 19 or 20. As soon as the discs 19 or 20 come to a standstill the attachment is released and the respectively required forming tool 7 or 8 can be pushed out of the receiving groove to the device 22 or 23 for connecting the tool changing device to the forming press by means of the respective push chain 9 or 10 onto the upper or lower clamping bar of the press brake. In other words: the transfer of the forming tools 7 and 8 between the two tool magazines 3 and 4 and the forming press by means of the push chain 9 and 10 is performed directly from or to the storage compartments of the forming tools in the tool magazines 3 and 4 and not by lifts or similar measures, as in tool magazines according to the prior art between the connecting points to the forming press and the storage compartments of the forming tools.

Furthermore, the receivers 21 are formed directly in the discs 19 and 20, i.e. such that the tool magazines 3 and 4 have no additional devices for holding the forming tools 7 or 8.

It is also shown clearly with reference to FIG. 2 that the discs 19 and 20 of the tool magazines 3 and 4 in this example embodiment each have a central recess 35, 36, wherein the push chains 9 and 10 are guided through at least one of the recesses—in this case through the recess 35 of the disc 19 of the first tool magazine 3—to the chain storage.

It is shown in FIG. 3 that the push chain is formed by individual chain links 13, wherein the chain links 13 comprise recesses 14 for mounting, preferably electrical lines 15. By means of the push chains thus not only pushing and pulling forces, but—in the case of electric lines—also electric signals can be transferred.

The chain links 13 are designed such that they are rigid in relation to one another in relation to two of the three directions in space—denoted in the coordinate system by 37, 38, 39 and 40—completely and in relation to the third dimension in space—depending on the definition of the coordinate system—in the direction of positive values 41 or negative values 42, and can be bent relative to one another in the opposite direction, i.e. in the direction of negative values 42 or positive values 41, so that the push chains can be rolled up in this direction 42. This configuration provides a large degree of stability for the push chain.

As shown with reference to FIG. 4, the transfer of the pushing and pulling forces is performed over three bearing surface 28, 29 and 30, which are formed between two adjacent chain links 13. In this way also at high speeds at which the push chains are moved an excellent transfer of force is ensured between the chain links 13.

FIG. 5 shows in an enlarged section the coupling device 12 for the temporary coupling of a forming tool 8 to the end of the push chain 10. In the shown example embodiment the coupling is performed by coupling elements 31 in the form of electromagnets. The power supply of the electromagnets is ensured via lines 15. Alternatively or in addition of course also an electrical storage medium can be provided for ensuring the power supply.

The coupling device 12 also comprises a measuring system for determining the position of the coupling device 12, by means of which the position of the coupling device 12 and thereby the position of the forming tool 8 coupled to the coupling device 12 can be determined in relation to the forming press or the tool changing device. Alternatively or in addition, a measuring system can be provided which does not move with the coupling device, but is arranged in a fixed manner relative to the tool changing device or relative to the forming press and the position der coupling device or the position of a forming tool coupled to the coupling device is detected by optical means for example. The communication with the measuring system can be performed—as in the shown case—via signal lines, which are integrated into the push chain 10 and/or wirelessly, e.g. by radio (cf. also FIG. 9).

In the shown example embodiment the push chains are driven respectively by a drive device, wherein the drive device 24 for the lower for push chain 10 is shown schematically in FIG. 6. It can be seen that the drive device 24 comprises two pairs of drive shafts 16 arranged behind one another. The transfer of force from the drive shafts 16 to the push chain 10 is performed by friction, wherein to increase the friction the drive shafts 16 are coated.

Furthermore, the pressing forces of the drive shafts 16 can be adjusted to the push chain 10 by means of adjusting devices 55 which comprise springs. By means of spring loading constant pressing forces of the drive shafts 16 on the push chain 10 are produced—even if there are appearances of wear on the drive shafts 16 and/or on the push chain 10.

The drive shafts 16 are driven by a motor 32 in the form of a servomotor, wherein between the motor 32 and the drive shafts 16 a gear device is provided with a plurality of gear wheels 33. The drive device 24 also comprises a housing 34.

A further way of driving the push chain is to provide a driving device, which comprises drive wheels and/or drive discs, which engage in the push chain in a form-locking manner.

FIGS. 7 to 9 show a push chain 9 or 10 according to a further embodiment. Compared to the embodiment shown in FIGS. 3 to 5, the chain links from which the push chain is formed has no recesses for mounting, preferably electrical lines. The form and the interaction of the chain links are otherwise unchanged.

A push chain according to this embodiment is preferably used in a coupling device 11 or 12, as shown in FIG. 9. The essential features of this coupling device are:
 a storage device for storing electrical power,
 an interface 44 for transferring electrical power into the storage, wherein the interface works together with a corresponding counter interface, which is arranged in the region of the chain storage for storing the push chain, such that the storage is charged with an inserted push chain,
 a communication device 43 in the form of a radio antenna for the wireless exchange of data with the control system for the control of the tool changing device,
 a magnetic coupling element in the form of a permanent magnet 46 in combination with an electromagnet 31,
 a sensor 47 for the detection of a forming tool coupled to the coupling device 11 or 12, wherein the measuring signals of the sensor 47 are transmitted by means of the communication device 43 from the control system, and
 an ON/OFF switch 45 for activating or deactivating the supply of electricity.

FIG. 10 shows an arrangement comprising a forming press 2 and a tool changing device 1 according to a further embodiment of the invention. In comparison to the arrangement shown in FIG. 1 the tool changing device 1 is arranged in this case—as viewed from the front—on the right and not on the left side of the forming press 2.

Apart from some details the two embodiments also differ in the type of connection of the tool changing device 1 to the forming press 2. It is essential in this case that the device 48 for connecting the clamping bar 26 for the upper tools 7 to the tool magazine 3 of the tool changing device 1 comprises a turning device for rotating the forming tools (7) by 180°. It should also be noted that such a turning device can be provided regardless of which side of the forming press the tool changing device is arranged on.

Details of the turning device are given in FIG. 11 a) and FIG. 11 b): the turning device comprises a support structure 53, which can be connected to the tool magazine 3. On the support structure 53 a gear motor 51 is arranged, by means of which a first guide element 50 can be moved into different rotational positions relative to the support structure 53 or relative to a second guide element 54 secured to the latter. By means of proximity switches 52, also known as proximity initiators, the respective rotary position can be detected.

In the position according to FIG. 11 a) the two guide elements 50 and 54 enclose an angle α of 0° or 180° relative to one another. This means that the guide elements 50 and 54 are aligned collinearly relative to one another in this position and relative to the clamping bar 26 of the forming press 2 (cf. FIG. 10). There is thus a connection/coupling of the tool magazine 3 to the forming press 2 and forming tools 7 can be transferred by means of the transfer device 5 from the tool magazine 3 to the forming press 2 and in reverse direction.

In the position according to FIG. 11 b) the two guide elements 50 and 54 enclose an angle α of 90° relative to one another (the central longitudinal axes are indicated by dashed lines). This means that the guide elements 50 and 54—and thereby the tool magazine 3 and the forming press 2—are disconnected from one another. In this position or in any position in which the two guide elements 50 and 54 can enclose an angle α which is not equal to 0° or 180°, the clamping bar 26 of the forming press 2 can be moved independently of the tool magazine, e.g. during a forming process.

A further advantage of the turning device is that the forming tools 7 can be rotated by 180° in a simple manner: for this purpose only the forming tool 7 to be rotated needs to be placed on the first guide element 50 and this is then rotated by means of the gear motor 51 by 180°. Such a rotation of 180° is in particular an advantage if asymmetrical forming tools 7 are used.

The invention claimed is:
1. A tool changing device comprising:
 at least one tool magazine and
 at least one transfer device for transferring forming tools storable in the at least one tool magazine to a forming press and for transferring the forming tools from the forming press to the at least one tool magazine,
 wherein the at least one transfer device comprises a drivable push chain for transferring pushing and pulling forces, and
 wherein the at least one tool magazine comprises a drivable, rotatably mounted disc, mounted for rotation about a rotation axis and having a plurality of groove-like receivers for receiving the forming tools, and wherein the at least one transfer device transfers the forming tools to and from the groove-like receivers along an axis that is transverse relative to the rotation axis.

2. The tool changing device as claimed in claim 1, wherein the push chain comprises at least one coupling device for temporary coupling of a forming tool of the forming tools to the push chain.

3. The tool changing device as claimed in claim 2, wherein the at least one coupling device comprises
at least one magnetic coupling element, and/or
at least one sensor configured to detect a forming tool coupled to the at least one coupling device, and/or
at least one communication device for a wireless transfer of data.

4. The tool changing device as claimed in claim 1, wherein the drivable push chain can be driven by at least one drive device.

5. The tool changing device as claimed in claim 4, wherein a transfer of force from the at least one drive device to the push chain is performed by friction.

6. The tool changing device as claimed in claim 4, wherein the at least one drive device comprises drive shafts, and wherein the drive shafts are coated, and/or pressing forces of the drive shafts can be adjusted to the drivable push chain via at least one adjusting device.

7. The tool changing device as claimed in claim 1, wherein the tool changing device comprises at least one chain storage for storing the push chain.

8. The tool changing device as claimed in claim 1, wherein the drivable, rotatably mounted disc comprises a central recess, and the push chain can be moved from an area of the central recess from the at least one tool magazine to the forming press and from the forming press to the at least one tool magazine.

9. The tool changing device as claimed in claim 1, wherein the at least one tool magazine is designed to be height-adjustable to adjust the height of the at least one tool magazine relative to the forming press.

10. The tool changing device as claimed in claim 1, wherein the at least one tool magazine comprises at least one first tool magazine for storing stamping tools and at least one second tool magazine for storing counter tools for the stamping tools.

11. The tool changing device as claimed in claim 10, wherein the at least one transfer device comprises:
a first transfer device for transferring the stamping tools from the at least one first tool magazine to the forming press and from the forming press to the at least one first tool magazine, and
a second transfer device for transferring the counter tools from the at least one second tool magazine to the forming press and from the forming press to the at least one second tool magazine, and
wherein the first transfer device comprises the drivable push chain.

12. The tool changing device as claimed in claim 1, wherein the tool changing device comprises at least one device for connecting the tool changing device to the forming press.

13. The tool changing device as claimed in claim 12, wherein the at least one device for connecting the tool changing device to the forming press comprises a guide for the push chain.

14. An arrangement comprising:
the tool changing device as claimed in claim 1, and
a forming press.

15. A method comprising:
providing a tool changing device as claimed in claim 1,
storing a forming tool in the at least one tool magazine of the tool changing device, and
transferring, via the at least one transfer device, the forming tool from the at least one tool magazine to the forming press,
wherein pushing and pulling forces are transferred via the drivable push chain of the at least one transfer device.

16. The tool changing device as claimed in claim 1, wherein the drivable, rotatably mounted disc comprises a central recess, and
wherein the groove-like receivers extend from the central recess to an outer circumference of the drivable, rotatably mounted disc.

17. A tool changing device comprising:
an upper tool magazine,
a lower tool magazine,
a first transfer device for transferring forming tools storable in the upper tool magazine to a forming press and for transferring the forming tools from the forming press to the upper tool magazine, and
a second transfer device for transferring forming tools storable in the lower tool magazine to the forming press and for transferring the forming tools from the forming press to the lower tool magazine,
wherein the first transfer device comprises a first drivable push chain for transferring pushing and pulling forces, and
wherein the second transfer device comprises a second drivable push chain for transferring pushing and pulling forces, and
wherein at least one of the upper tool magazine and the lower tool magazine comprises a drivable, rotatably mounted disc mounted for rotation about a vertical rotation axis and having receivers for receiving the forming tools.

18. The tool changing device as claimed in claim 17, wherein the first drivable push chain of the first transfer device comprises at least one coupling device for temporary coupling of a forming tool of the forming tools to the first push chain.

19. The tool changing device as claimed in claim 18, wherein the at least one coupling device comprises
at least one magnetic coupling element, and/or
at least one sensor configured to detect a forming tool coupled to the at least one coupling device, and/or
at least one communication device for a wireless transfer of data.

20. A tool changing device comprising:
at least one tool magazine, and
at least one transfer device for transferring forming tools storable in the at least one tool magazine to a forming press and for transferring the forming tools from the forming press to the at least one tool magazine,
wherein the at least one transfer device comprises a drivable push chain for transferring pushing and pulling forces,
wherein the at least one tool magazine comprises a drivable, rotatably mounted disc having receivers for receiving the forming tools, and
wherein the rotational axis of the rotatably mounted disc is vertical.

* * * * *